Figure 1:
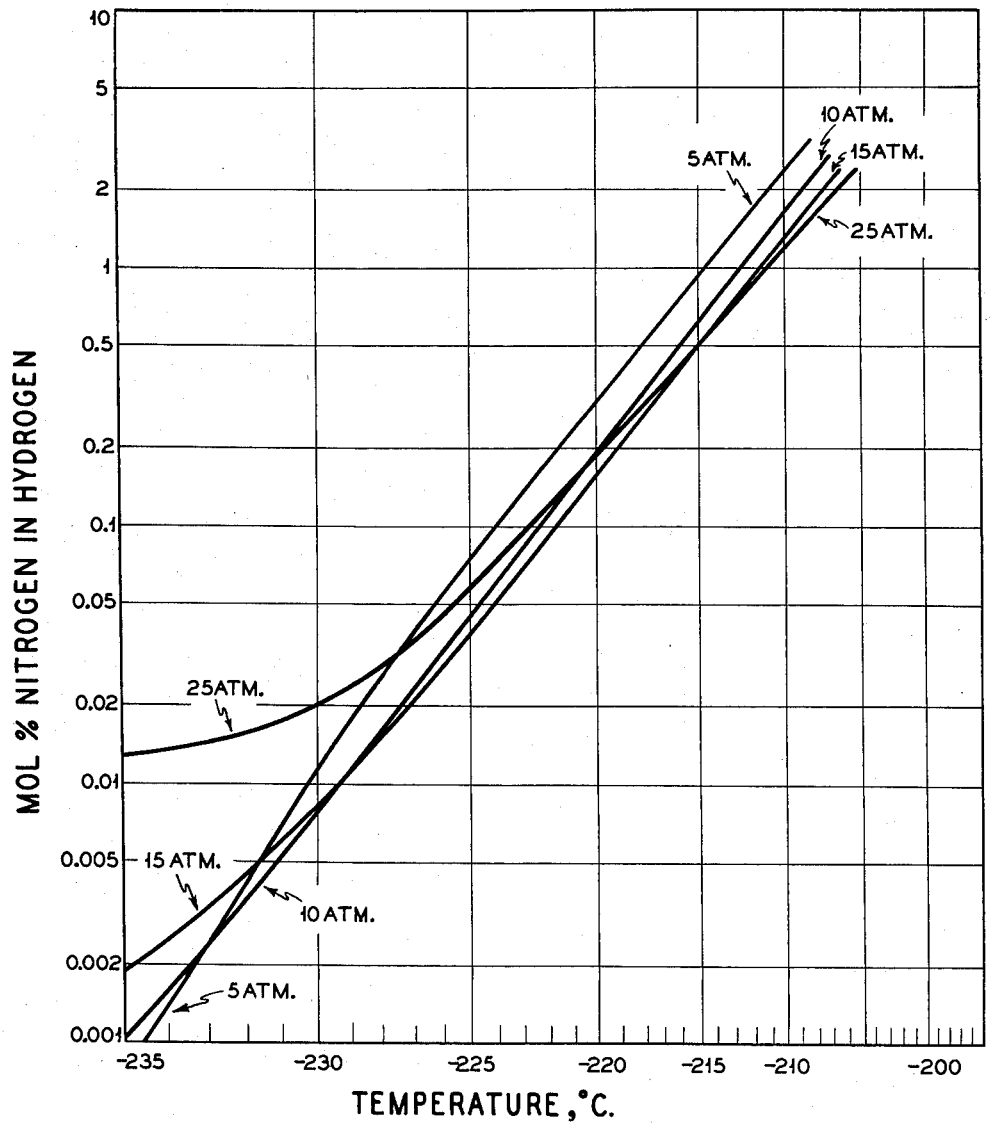

July 16, 1963  R. HOUSTON  3,097,940
PROCESS FOR PURIFYING GASES
Filed March 1, 1961  3 Sheets-Sheet 2

INVENTOR.
REAGAN HOUSTON
BY
William F. Mesinger
ATTORNEY

INVENTOR.
REAGAN HOUSTON

United States Patent Office 3,097,940
Patented July 16, 1963

3,097,940
PROCESS FOR PURIFYING GASES
Reagan Houston, Williamsville, N.Y., assignor to Union
Carbide Corporation, a corporation of New York
Filed Mar. 1, 1961, Ser. No. 92,524
10 Claims. (Cl. 62—12)

This invention relates to an improved process for purifying gases, and more particularly for the low temperature separation of higher boiling impurities such as nitrogen from a crude feed gas having a major constituent boiling below about —245° C., such as hydrogen, helium or neon.

A convenient source of hydrogen in large quantities is the partial oxidation of fuels such as natural gas and oil followed by the so-called "water gas shift" process. The latter converts most of the carbon monoxide produced by the partial oxidation into carbon dioxide, with the simultaneous release of additional hydrogen. The gaseous hydrogen obtained by such methods normally contains higher boiling impurities such as methane and/or lower boiling impurities such as nitrogen and carbon monoxide which must be removed in order for the hydrogen to be suitable for most commercial purposes. For example, the efficiency of certain metallurgical processes such as direct reduction of iron ore is substantially improved if such contaminants are removed. Also, hydrogen intended for liquefication must be of extremely high purity because most of the impurities normally encountered will solidify in the liquefier and limit the uninterrupted operation of the equipment.

Hydrogen of about 98% purity is commonly recovered by cooling a gas such as coke oven gas down to near the freezing point of nitrogen. Moreover, the hydrogen may be further cooled in reversing heat exchangers to below the freezing point of nitrogen, thereby depositing the impurity on the walls of the exchanger passageways. For a continuously operating system suitable for large-scale commercial usage, the frozen nitrogen must be removed to avoid clogging of the passageways and eventual shutdown. A well-known method of accomplishing this removal is by purging the heat exchanger passageways with product hydrogen, but this has the serious disadvantage of recontaminating the latter with the reevaporated nitrogen impurity. Also, a substantial quantity of feed gas is lost from the system when the reversing passageway is cyclicly blown down from the higher feed gas pressure to the relatively low purge gas pressure.

Another widely employed method for removing impurities from a crude hydrogen feed stream is by contact with a suitable wash liquid such as propane, thereby absorbing the impurity in the wash. Unfortunately the regeneration of the resulting contaminated wash liquid involves complex and expensive equipment, and entails refrigeration losses which are avoided by the freeze-out methods.

A principal object of the present invention is to provide an improved method for cooling and cleaning an impurity-containing gas.

A further object is to provide an improved method for cooling and cleaning an impurity-containing gas by freezing such impurity without employing a purge gas for removing such impurity from the heat exchange surface.

A still further object is to provide a large-scale method for producing extremely high purity gas such as hydrogen, neon, helium and the like.

Another object is to provide an improved method for removing methane, carbon monoxide and nitrogen impurities from crude hydrogen feed gas, without recontaminating the resulting hydrogen product gas by such impurities.

Figure 2:
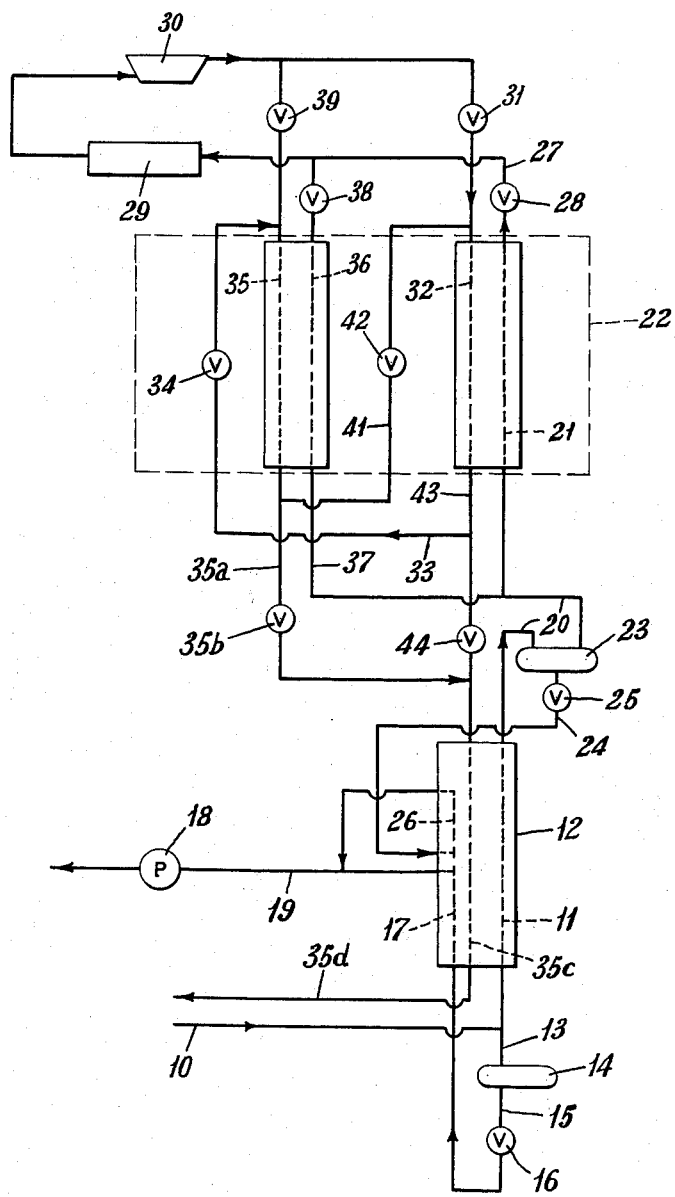
Figure 3:
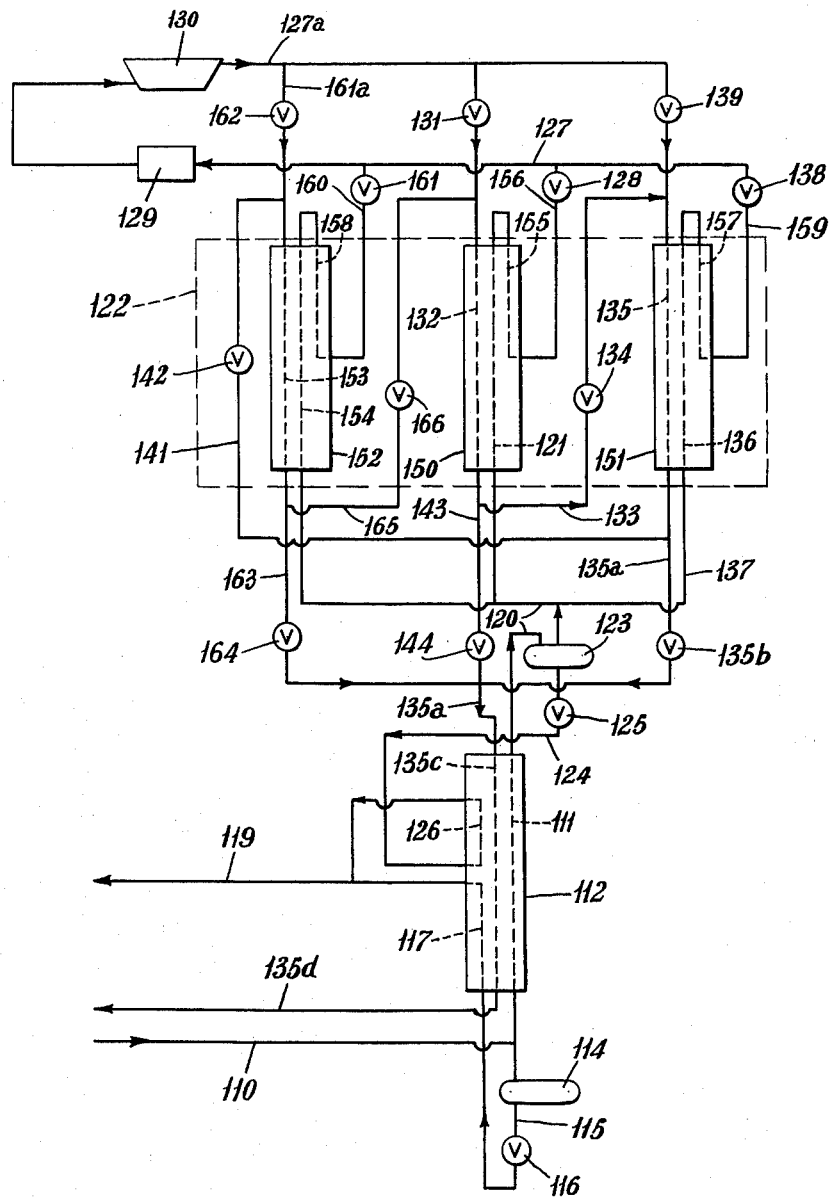

These and other objects and advantages of this invention will be apparent from the following description and accompanying drawings in which:

FIG. 1 is a graph showing the solubility of nitrogen in hydrogen gas at various pressures and temperatures;
FIG. 2 is a flow diagram of an exemplary system for purifying gases, according to the present invention; and
FIG. 3 is a flow diagram of a modified system for purifying gases, according to the invention.

It has unexpectedly been discovered that the aforestated objects can be accomplished by providing a first heat exchange zone with at least two thermally associated passageways, and providing an impurity-containing feed gas at the lower end of a first passageway in such zone for upward flow therethrough to the top end of the passageway. A refrigerant fluid flows through a second passageway in the heat exchange zone, and cools the feed gas during its upward flow to a temperature colder than the liquefaction point of the impurity. The impurity is thereby condensed on the walls of the first passageway and is drained from the lower end thereof. A partially purified feed gas is discharged from the top end of the same passageway.

It can thus be seen that an exceedingly simple system is provided which eliminates the necessity of employing a purge stream which is contaminated by the impurity and thus permits the whole of the product to be recovered in uncontaminated form. Furthermore, this invention does not necessitate high blow-down losses as encountered with reversing passage type heat exchanger wherein the fluid flows are periodically switched back and forth between thermally associated passageways.

A second heat exchange zone having third and fourth passageways is provided in addition to the previously described first heat exchange zone. In the second zone the partially purified feed gas is directed through the third passageway and is further cooled to a temperature colder than the snow point of the impurity thereby depositing the latter as a solid on the walls of the third passageway. A purified product gas is discharged from the top end of the third passageway. A second refrigerant fluid is provided for flow through the fourth passageway in the second heat exchange zone, and serves to further cool the partially purified feed gas by heat exchange during the latter's upward flow to a temperature colder than the snow point of the impurity. At a predetermined point in the cycle the flows of the partially purified feed and the second refrigerant to the third and fourth passageways respectively, are terminated. The third passageway is then warmed sufficiently by indirect heat exchange to melt the frozen impurity which is drained as a liquid from the third passageway lower end and flowed in heat exchange relation with the impurity-containing feed gas in the first passageway thereby cooling the feed and evaporating the impurity. In this manner, useful refrigeration is recovered from the impurities.

In a preferred embodiment of the invention, the second heat exchange zone has third and fourth thermally associated passageways and also fifth and sixth thermally associated passageways, there being no thermal association between the two pairs of thermally associated passageways. The feed gas has a main constituent boiling below about —245° C. and contains minor amounts of at least one lower boiling impurity such as nitrogen and may contain a higher boiling impurity such as methane. The feed is provided at a substantial working pressure and a low temperature colder than about —150° C. The feed gas is cooled in the first passageway as previously described to below the liquefaction point of the impurity. The resulting condensate is drained and heat exchanged with the impurity-containing feed stream in the first passageway thereby cooling such feed stream and evaporating the condensate. The partially purified feed stream is discharged from the top end of the first passageway and directed to the lower end of the third passageway for upward flow therethrough. This stream is further cooled by a second refrigerant flowing through the fourth passageway to a temperature below the snow point of the mixture thereby depositing essentially all of the impurity as solids on the walls of the third passageway. A purified product gas is discharged from the top end of the third passageway. At a predetermined time the flows of the partially purified feed stream and the second refrigerant fluid are switched from the third to the fifth passageway, and from the fourth to the sixth passageway respectively. The third passageway is then warmed sufficiently to melt the frozen impurity by a warming fluid flowing through the fourth passageway. The melted impurity is drained from the lower end of the third passageway and heat exchanged with the impurity-containing feed stream in the first passageway. The pressure in the third passageway may remain essentially unchanged during the thawing step.

The expression "liquefaction point" as used herein refers to the temperature at which the impurity first begins to liquefy from the feed stream at the feed gas pressure. Also, the expression "snow point" refers to the temperature at which the impurity begins to deposit out in the solid phase.

Although the invention will now be specifically described in terms of purifying crude hydrogen, it is equally suitable for the low temperature separation of impurities from other feed gases having a main constituent boiling below about −245° C., as for example, helium, neon and the like. Also, the invention will be specifically described in terms of removing methane and nitrogen impurities, but it is equally applicable to other low-boiling materials such as oxygen, argon and carbon monoxide.

Referring now to the drawings and FIGS. 1 and 2, crude hydrogen feed gas is supplied at a substantial working pressure and preferably precooled to about 83° K. (−190° C.) to remove impurities such as water and carbon dioxide. The inlet pressure is preferably between about 10 and 15 atmospheres although higher or lower pressures are satisfactory. The reason for this preferred inlet pressure range is that the solubility of nitrogen in hydrogen has been found to be unexpectedly lower at 10 and 15 atmospheres than at higher and lower pressures. This discovery is illustrated in FIG. 1, which is a graph showing the solubility of nitrogen in hydrogen at various temperatures and pressures. For example, at about −223° C., the solubility of nitrogen in hydrogen gas is shown to be as follows: 0.14 mol percent at 5 atmospheres, 0.08 mol percent at 10 atmospheres, 0.07 mol percent at 15 atmospheres and 0.09 mol percent at 25 atmospheres. The same general solubility relationship exists for nitrogen in other gases boiling below −245° C.

The crude hydrogen feed gas contains at least one impurity and as previously set forth, will be described as containing both methane and nitrogen impurities. The crude feed gas is supplied to conduit 10 at a pressure such as 15 atmospheres and a first temperature such as −190° C., and is directed to the lower end of first passageway 11 of heat exchanger 12 for further cooling to a lower temperature such as −207° C. This lower temperature is below the liquefaction points of methane and nitrogen, so that these materials are condensed as liquids and drain downwardly on the walls of first passageway 11 to the lower end thereof, and in countercurrent flow relaiton with the rising hydrogen gas. Passageway 11 preferably has a large surface area providing intimate contact between the downward flowing condensate and the rising feed. The condensing methane and nitrogen will thus serve to wash out (dissolve) additional quantities of impurities from the rising feed stream. Heat exchange zone 12 will therefore operate as a reflux condenser.

Cooling of the crude hydrogen feed gas to below the methane and nitrogen liquefaction temperatures is partially effected by passing a colder refrigerant fluid through a second passageway 35c which is thermally associated with first passageway 11. It should be understood that when a gas contains two mutually soluble components such as methane and nitrogen, the dew point of the mixture will not correspond to the boiling point of either impurity in pure form. The first drop of condensate formed will be a mixture of impurities with its own distinctive condensation temperature.

The liquefied methane and nitrogen are gravity drained from the lower end of first passageway 11 into branch conduit 13 and hence to collector vessel 14. The accumulated methane-nitrogen liquid is passed therefrom through bottom conduit 15 and control valve 16 thereon to passageway 17 which is thermally associated with first passageway 11 in the warmer part of first heat exchange zone 12. Depending on the inlet pressure and impurity content of the feed stream, it may be necessary or desirable to flow the methane-nitrogen impurity stream through passageway 17 at less than atmospheric pressure. For example, when the feed gas pressure is 15 atmospheres and contains 13.8% combined low-boiling impurities, the methane-nitrogen impurity stream is preferably drawn through passageway 17 at a pressure of about 0.4 atmosphere by a vacuum pump 18 in conduit 19, to provide a temperature differential of at least 1° C. The methane-nitrogen liquid is evaporated and superheated by such heat exchange, so that a substantial quantity of refrigeration is recovered therefrom and transferred to the cooling crude hydrogen feed stream.

The partially purified hydrogen gas is discharged from the upper end of first passageway 1 into conduit 20 at an intermediate temperature such as about −207° C. and may contain about 2. mol percent nitrogen plus carbon monoxide if the latter is present. The partially cooled and cleaned feed gas is then directed through conduit 20 to the lower end of third passageway 21 in second heat exchange zone 22 for further cooling to a temperature below the snow point of nitrogen, e.g. −227° C. During the initial part of this cooling step, further nitrogen is liquefied and drained from the lower end of third passageway 21 through conduit 20 to collector vessel 23. The liquid nitrogen accumulating therein is withdrawn through bottom conduit 24 having control valve 25 therein, and directed to passageway 26 which is thermally associated with first passageway 11 in the colder section of first heat exchange zone 12. The liquid nitrogen impurity is evaporated by such heat exchange and withdrawn through connecting conduit 19 by vacuum pump 18 in the previously described manner.

Returning now to second heat exchange zone 22, the freezing nitrogen impurity deposits on the walls of third passageway 21, leaving only about 200 p.p.m. nitrogen in the further purified hydrogen stream exiting from the upper end of passageway 21 into conduit 27 having control valve 28 therein. This residual impurity is preferably further reduced by flowing the hydrogen stream through adsorbent bed 29 at about −227° C. Suitable adsorbent materials include charcoal, silica gel and crystalline zeolitic molecular sieves. The hydrogen gas discharged from adsorbent bed 29 now contains about 10 p.p.m. nitrogen or less and is work expanded through turbine 30 to a lower pressure such as about 7.3 atmospheres. It should be noted that the previous adsorption step prevents solid deposition in the turbine, which could erode the latter's blades.

Assuming 70% turbine efficiency, the hydrogen product discharged from the turbine is about −236° C., and the latter's sensible refrigeration is recovered in the heat exchange system by first flowing through control valve 31 to fourth passageway 32 in second heat exchange zone 22, this passageway being thermally associated with third passageway 21 through which the further cooling, partially cleaned hydrogen gas stream is flowing. The partially rewarmed product hydrogen emerges from the warm end of fourth passageway 32 in second heat exchange zone 22 into conduit 43 at about −208° C. from whence it is directed through conduit 33 and control valve 34 to the cold end of sixth passageway 35. This passageway is thermally associated with fifth passageway 36, also in second heat exchange zone 22. During the previous on-stream stroke, partially purified hydrogen gas has flowed upwardly through fifth passageway 36 and deposited frozen nitrogen on the walls thereof by virtue of heat exchange with pure, cold product hydrogen in sixth passageway 35. The partially warmed product hydrogen now in passageway 35 serves to rewarm the frozen nitrogen sufficiently for melting thereof and draining by gravity downwardly through the passageway lower end, through conduit 37 for passage into second collector vessel 23. The melted nitrogen is accumulated therein along with the condensed nitrogen drained from third passageway 21, and the composite liquid nitrogen impurity is evaporated by heat exchange with the crude hydrogen feed stream in first heat exchange zone 12 as previously described.

The further warmed hydrogen product gas emerging from the lower end of sixth passageway 35 is directed through conduit 35a and control valve 35b therein at about −209° C. to the upper end of second passageway 35c in first heat exchange zone 12. This product gas flows downwardly through second passageway 35c as the first refrigerant fluid which serves to cool the crude hydrogen feed gas in first passageway 11 to a temperature colder than the liquefaction point of the impurities. In this manner substantially all of the sensible refrigeration of the product gas is recovered and the latter is discharged from the lower end of second passageway 35c into conduit 35d at about the temperature of the entering feed. This gas is at a pressure of, for example 7.3 atmospheres, has a purity of higher than about 99.99% hydrogen.

Second heat exchange zone 22 may be continuously operated by periodically switching the flow of the partially purified feed stream from third passageway 21 to the lower end of fifth passageway 36 by closing valve 28 and opening valve 38, both at the cold end of this zone. Simultaneously, the flow of the second refrigerant fluid or more specifically the work expanded product hydrogen is directed from fourth passageway 32 to sixth passageway 35 by closing valve 31 and opening valve 39 at the cold end of second heat exchange zone 22. These flow changes may for example be made when the frozen nitrogen builds up in third passageway 21 to the point where the pressure drop across this passageway becomes excessive. To obtain warmup and melting of the frozen nitrogen deposited in third passageway, the partially warmed hydrogen product gas discharged from the lower end of sixth passageway 35 into conduit 35a is diverted through branch conduit 41 having valve 42 therein to the upper end of fourth passageway 32 for downward flow therethrough. The further warmed hydrogen product gas emerging from the lower end of fourth passageway 32 into conduit 43 is directed through control valve 44 to the upper end of second passageway 35c for flow in the previously described manner.

FIG. 3 illustrates another embodiment of the invention which is similar to the FIG. 2 system but which differs in certain particulars to be described in detail. The undescribed portions of the FIG. 3 system are substantially identical to the corresponding parts of the FIG. 2 embodiment, and for clarity corresponding items are identified in FIG. 3 by adding 100 to the FIG. 2 designation. Second heat exchange zone 122 comprises three instead of two heat exchangers piped in parallel flow relation so that more time is available for thawing the unit having previously been loaded with frozen nitrogen impurity. Also a product hydrogen reheat passageway is provided in the cold end of second heat exchange zone 122 to partially warm such product thereby allowing the expansion turbine to operate at a warmer temperature level where its efficiency is higher. This feature also decreases the temperature difference at the cold end of zone 122 so that less refrigeration is required to recool the exchangers after thawing as discussed hereinafter.

For purposes of illustration it may be assumed that first heat exchanger 150 having third and fourth passageways 121 and 132 is on-stream, second heat exchanger 151 having fifth and sixth passageways 135 and 136 is being thawed, and third heat exchanger 152 having seventh and eighth passageways 153 and 154 is being cooled down preparatory to being placed on-stream. The product hydrogen gas emerging from the cold end of third passageway 121 is returned through reheat passageway 155 in thermal association with third passageway 121, and partially warmed thereby to an intermediate temperature such as about −219° C. The partially warmed product gas is then directed through conduit 156 and connecting conduit 127 to adsorbent bed 129 and expansion turbine 130. Second and third heat exchangers 151 and 152 are provided with corresponding reheat passageways 157 and 158 respectively, and conduits 159 and 160 respectively. Also, third heat exchanger 152 is provided with control valve 161 in conduit 160, corresponding to valves 128 and 138 in conduits 156 and 159 respectively.

The work expanded product hydrogen gas is directed through fourth passageway 132 in countercurrent heat exchange with the further cooling partially purified hydrogen gas rising through third passageway 121. The resulting partially warmed work expanded product hydrogen is discharged from the warm end of fourth passageway 132 and directed through communicating conduits 143 and 133 to the cold end of fifth passageway 135 to obtain warmup of thermally associated sixth passageway 136 and melting of the frozen nitrogen in the previously described manner.

To prepare the previously thawed third heat exchanger 152 for the succeeding on-stream step, a minor part of the work expanded product hydrogen is diverted from conduit 127a through branch conduit 161a having control valve 162 therein to seventh passageway 153 in third heat exchanger 152. A partially warmed work expanded product hydrogen minor part is discharged from the lower end of this passageway into conduit 163 having control valve 164 therein, and joined with the major part of the partially warmed work expanded product hydrogen in conduit 135a. The composite stream is then introduced to the upper end of second passageway 135c for downward flow therethrough as the first refrigerant to cool the crude hydrogen feed stream in thermally associated first passageway 111. Similarly, when second heat exchanger 151 has been thawed and is ready for cooldown, work expanded product hydrogen is diverted through valve 139, and through valve 131 in the case of first heat exchanger 150.

Cooldown of the cleaned heat exchangers before processing the partially purified hydrogen feed gas is advantageous because it maximizes the quantity of nitrogen frozen out and deposited on the passageway walls during the first portion of the succeeding on-stream step. Without cooldown the passageway may be initially above the nitrogen snow point of the flowing feed gas, and the product gas initially emerging from the upper end of the passageway may contain an excessive amount of nitrogen impurity thereby increasing the nitrogen to be removed by adsorption trap 129. It is to be understood that the cooldown step may be initiated simultaneously with the on-stream and thawout steps, or part way through these steps as long as the heat exchanger is cooled in time for the succeeding on-stream step.

When the quantity of frozen nitrogen deposited on the walls of third passageway 121 is sufficiently large, first exchanger 150 may be taken off-stream and placed on thaw, while simultaneously placing third heat exchanger 152 on-stream and second heat exchanger 151 on cooldown. The flow changes are made by closing and opening appropriate valves as will be understood by those skilled in the art, following the corresponding described cycle changes in the FIG. 2 system. For example, the partially warmed work expanded product hydrogen discharged from the lower end of seventh passageway 153 is directed through conduit 165 having control valve 166 therein to the upper end of fourth passageway 132 for downward flow therethrough.

Similarly, when the quantity of frozen nitrogen deposited on the walls of eighth passageway 154 is sufficiently large, third heat exchanger 152 is taken off-stream and placed on-thaw, while second heat exchanger 151 is placed on-stream.

It has been discovered that a temperature pinch is beneficial in the warmer part of the second heat exchange zones 22 and 122. That is, the temperature difference between the product gas and the impurity containing feed gas should be made small at the snow point of the impurities and larger at temperatures colder than the snow point. The objective is to deposit the solid impurities in a layer of reasonably uniform thickness and minimize the obstruction of the heat exchangers by the solids. As a gas mixture is cooled 1° below the impurity snow point, a larger amount of material is generally deposited out than when the gas is further cooled through an additional degree. Referring again to FIG. 1, hydrogen gas at 5 atmospheres' pressure dissolves the following amounts of nitrogen.

| | Percent $N_2$ |
|---|---|
| At −223° C | 0.14 |
| −224° C | 0.10 |
| −225° C | 0.07 |

Cooling this mixture from −223° C. to −224° C. deposits 0.04 mol of nitrogen per 100 mol gas. Subsequent cooling to −225° C. deposits only .03 mol $N_2$. By providing a lower temperature difference where the impurity-containing hydrogen is cooled from −223° C. to −224° C. than from −224° C. to −225° C., a longer length of heat exchanger passage is required and the .04 mol of nitrogen is spread over a larger area. The present invention contemplates controlling the temperature difference in the heat exchange zone by keeping the weight flow times specific heat of the refrigerant fluid or fluids less than the weight flow times specific heat of the impurity-containing stream and by flowing the streams in essentially counter-current relations. Specific heat of the impurity containing stream is here defined to include the heat extracted by solidifying solids.

The net effect of this temperature pinch is the prevention of an excessive rate of nitrogen deposition in the area where the nitrogen concentration is highest. By providing a small temperature difference at the warmer end of the second heat exchanger zone, preferably 1° to 3° C., the rate at which solids are deposited can be made approximately uniform over most of the nitrogen deposition section of the passageways; if solids are deposited too rapidly in any one section, the passageway will plug up prematurely.

It will be noted from the foregoing description that one important advantage of this invention is that no purge gas is required and reversing heat exchangers are not employed, so that there is no blowdown loss of feed hydrogen and no portion of the product hydrogen is recontaminated by the impurities. That is, the product hydrogen never flows through a passageway containing impurities, such passageways being cleaned by indirect warmup and drainage, not by reversing flows for purge gas passage therethrough.

Although preferred embodiments of the invention have been described in detail, it is contemplated that modifications of the process may be made and that some features may be employed without others, all within the spirit and scope of the invention.

What is claimed is:

1. A process for cooling and cleaning an impurity-containing gas comprising the steps of providing a first heat exchange zone having first and second thermally associated passageways and a second heat exchange zone having third and fourth thermally associated passageways; providing an impurity-containing feed gas at the lower end of said first passageway for upward flow therethrough to the top end of such passageway; providing a first refrigerant fluid for flow through said second passageway; cooling said impurity-containing feed gas by heat exchange with said first refrigerant during said upward flow to a temperature between the liquefaction and snow points of said impurity thereby condensing the impurity as a liquid on the walls of said first passageway; draining the condensed impurity from the first passageway lower end; discharging the impurity-depleted feed gas from said top end of said first passageway and directing the gas to the lower end of said third passageway for upward flow therethrough to the top end of such passageway; providing a second refrigerant fluid for flow through said fourth passageway in said second heat exchange zone; further cooling said impurity-depleted feed gas by heat exchange with said second refrigerant during said upward flow to a temperature below the snow point of said impurity thereby depositing the frozen impurity on the walls of said third passageway; discharging an impurity-further depleted product gas from the top end of said third passageway; terminating the flow of said impurity-depleted feed gas to said third passageway and the flow of said second refrigerant to said fourth passageway; warming said third passageway sufficiently to melt said frozen impurity; draining the melted impurity from the third passageway lower end and flowing such liquid impurity in heat exchange relation with said impurity-containing feed gas in said first passageway thereby effecting cooling of such feed gas and evaporation of the impurity.

2. A process according to claim 1 wherein the condensed impurity drained from said first passageway lower end is heat exchanged with said impurity-containing feed gas in said first passageway thereby effecting cooling of such feed gas and evaporation of the impurity.

3. A process for the low temperature separation of methane and nitrogen impurities from a crude feed gas having a main constituent boiling below about −245° C. including the steps of providing a first heat exchange zone having first and second thermally associated passageways and a second heat exchange zone having third and fourth thermally associated passageways, and fifth and sixth thermally associated passageways being thermally separated from the third and fourth passageways; providing a feed stream at a first pressure and at the lower end of said first passageway for upward flow therethrough to the top end of such passageway, said feed stream including said main constituent and containing minor amounts of such impurities at above-atmospheric working pressure and a low temperature colder than about −150° C.; providing a first refrigerant fluid for flow through said second passageway; cooling the impurity-containing feed stream by heat exchange with said refrigerant during said upward flow to a temperature between the liquefaction and snow point of said impurities thereby condensing the impurities as a liquid on the walls of said first passageway; draining a methane-nitrogen condensate from the first passageway lower end and heat exchanging such liquid with said impurity-containing feed stream in said first passageway thereby cooling such feed stream and evaporating the condensate; discharging the partially purified feed stream from said top end of said first passageway and directing the stream to the lower end of said third passageway for upward flow therethrough to the top end of such passageway; providing a second refrigerant fluid for flow through said fourth passageway in said second heat exchange zone; further cooling said partially purified feed stream by heat exchange with said second refrigerant during said upward flow to a temperature colder than the snow point of said partially purified feed stream thereby depositing frozen additional impurity on the walls of said third passageway; discharging an impurity-depleted product gas from the top end of said third passageway; periodically switching the flow of said partially purified feed stream from said third passageway to the lower end of said fifth passageway, and the flow of said second refrigerant fluid from said fourth passageway to said sixth passageway to effect said further cooling of said feed stream and deposition of said frozen additional impurity in the fifth passageway; warming said third passageway sufficiently to melt the frozen additional impurity; draining the resulting liquid impurity from the third passageway lower end and heat exchanging such liquid impurity with the impurity-containing feed stream in said first passageway thereby cooling such feed stream and evaporating the impurity.

4. A process according to claim 3 including the steps of work expanding the impurity-depleted product gas to a lower pressure; directing at least most of such work expanded product to said fourth and sixth passageways as said second refrigerant which is partially warmed by such flow; directing the partially warmed, work expanded product through said fourth passageway after terminating the flow of said work expanded product therethrough so as to effect the melting of said frozen nitrogen impurity in said third passageway.
and periodically switching the flow of partially warmed second refrigerant from said fourth passageway to said sixth passageway after terminating the flow of work expanded product therethrough so as to effect the melting of frozen impurity in said fifth passageway.

5. A process according to claim 3 including the steps of adsorbing residual traces of nitrogen from the product gas; work expanding the product gas to a lower pressure; directing at least most of such work expanded product gas to said fourth and sixth passageways as said second refrigerant which is partially warmed by such flow; directing the partially warmed work expanded product through said fourth passageway after terminating the flow of said work expanded product therethrough so as to effect the melting of said frozen nitrogen impurity in said third passageway and periodically switching the flow of partially warmed second refrigerant from said fourth passageway to said sixth passageway after terminating the flow of work expanded product therethrough so as to effect the melting of frozen impurity in said fifth passageway.

6. A process according to claim 3 in which hydrogen is the main constituent of said feed gas, and said feed stream is provided at a pressure between about 10 and 15 atmospheres.

7. A process according to claim 3 including the steps of partially warming the product gas by returning such gas from the third passageway top end towards the lower end thereof in thermal association with the cooling feed stream in such passageway, withdrawing the partially warmed product gas from an intermediate thermal level between the top and lower ends of said second heat exchange zone, work expanding said partially warmed product gas to a lower pressure thereby recooling the gas, directing at least most of such work expanded product gas to said fourth and sixth passageways as said second refrigerant which is partially warmed by such flow, and diverting the partially warmed work expanded product through said fourth passageway after terminating the flow of said work expanded product therethrough so as to effect the melting of said frozen nitrogen impurity in said third passageway and periodically switching the flow of partially warmed second refrigerant from said fourth passageway to said sixth passageway after terminating the flow of work expanded product therethrough so as to effect the melting of frozen impurity in said fifth passageway.

8. A process according to claim 3 including the steps of work expanding the impurity-depleted product gas to a lower pressure, dividing the work expanded product gas into a minor part and a major part, directing said major part of said work expanded product gas to said fourth and sixth passageways as said second refrigerant which is partially warmed by such flow, directing the partially warmed work expanded product through said fourth passageway after terminating the flow of said work expanded product therethrough so as to effect the melting of said frozen additional impurity in said third passageway, and directing said minor part through said third passageway after drainage of said liquid impurity therefrom so as to recool such passageway and periodically switching the flow of the major and minor parts of said product gas from said fourth and third passageways to said sixth and fifth passageways respectively.

9. A process according to claim 1 wherein the respective flows of said impurity-depleted feed gas and said second refrigerant in said second heat exchange zone are regulated so that the temperature difference between the feed gas and second refrigerant at the warm end of such zone is between about 1° and 3° C.

10. A process for the low-temperature separation of methane and nitrogen impurities from a crude feed gas having a main constituent boiling below about −245° C. including the steps of providing a first heat exchange zone having first and second thermally associated passageways and a second heat exchange zone having a first heat exchanger with third and fourth thermally associated passageways, a second heat exchanger with fifth and sixth thermally associated passageways, and a third heat exchanger with seventh and eighth thermally associated passageways; providing a feed stream at a first pressure and at the lower end of said first passageway for upward flow therethrough to the top end of such passageway, said feed stream including said main constituent and containing minor amounts of such impurities at above-atmospheric working pressure and a low temperature colder than about −150° C.; providing a first refrigerant fluid for flow through said second passageway; cooling the impurity-containing feed stream by heat exchange with said refrigerant during said upward flow to a temperature between the liquefaction and snow points of said impurities thereby condensing the impurities as a liquid on the walls of said first passageway; draining a methane-nitrogen condensate from the first passageway lower end and heat exchanging such liquid with said impurity-containing feed stream in said first passageway thereby cooling such feed stream and evaporating the condensate; discharging the partially purified feed stream from said top end of said first passageway and directing the stream to the lower end of said third passageway for upward flow therethrough to the top end of said passageway; providing a second refrigerant fluid for flow through said fourth passageway in said second heat exchange zone; further cooling said partially purified feed stream by heat exchange with said second refrigerant during said upward flow to a temperature colder than the snow point of said partially purified feed stream thereby depositing frozen additional impurity on the walls of said third passageway; discharging an impurity-depleted product gas from the top end of said third passageway; work expanding such product gas to a lower pressure; directing a major part of such work expanded product to said fourth passageway as said second refrigerant which is partially warmed by such flow; directing the partially warmed, work expanded product major part through said fifth passageway so as to melt frozen additional impurity previously deposited on the walls of the thermally associated sixth passageway during feed stream flow therethrough; draining the resulting liquid impurity from the sixth passageway lower end and heat exchanging such liquid impurity with the impurity-containing feed stream in said first passageway thereby cooling such feed stream and evaporating the impurity; diverting a second minor part of said work expanded product to said seventh passageway for recooling of the thermally associated eighth passageway having previously been cleaned of said frozen additional impurity by melting thereof; joining the major and minor parts of warmed and work expanded product gas from the fifth and seventh passageways and directing the resulting mixture to said second passageway as said first refrigerant; discharging further warmed product gas from said second passageway; respectively periodically switching the flow of said partially purified feed stream from said third to eighth passageway for said further cooling, the flow of said major part of work expanded product from said fourth to seventh passageway for said partial warming, the flow of said partially warmed work expanded major part from said fifth to fourth passageway to melt said frozen additional impurity, and the flow of said second minor part of work expanded product from said seventh to fifth passageway for recooling; thereafter respectively periodically switching the flow of said partially purified feed stream from said eighth to sixth passageway for said further cooling; the flow of said major part of work expanded product from said seventh to fifth passageway for said partial warming, the flow of said partially warmed work expanded major part from said fourth to seventh passageway to melt said frozen additional impurity, and the flow of said second minor part of work expanded product from said fifth to fourth passageway for recooling.

References Cited in the file of this patent

UNITED STATES PATENTS

| | | |
|---|---|---|
| 1,723,425 | Jaubert | Aug. 6, 1929 |
| 1,830,610 | Linde | Nov. 3, 1931 |
| 1,842,263 | Gobert | Jan. 19, 1932 |
| 2,022,782 | Pollitzer | Dec. 3, 1935 |
| 2,252,739 | Stoever | Aug. 19, 1941 |
| 2,849,867 | Haringhuizen | Sept. 2, 1958 |
| 2,960,835 | Gaumer | Nov. 22, 1960 |

FOREIGN PATENTS

| | | |
|---|---|---|
| 275,633 | Great Britain | Dec. 3, 1928 |
| 511,567 | Germany | Oct. 31, 1930 |
| 685,490 | Germany | Dec. 19, 1939 |